Aug. 29, 1967     A. J. BURKE ETAL     3,338,324
PLATFORM SCALE WITH ASYMMETRICAL LEVER
ARMS USING TORSION PRINCIPLE Filed Sept. 16, 1965     6 Sheets-Sheet 1

FIG. 1

INVENTOR
ARTHUR J. BURKE
B. A. KARAS

BY   *Norris & Bateman*

ATTORNEYS

INVENTOR
ARTHUR J. BURKE
B. A. KARAS

BY  Norris & Bateman

ATTORNEY

United States Patent Office 3,338,324
Patented Aug. 29, 1967

3,338,324
PLATFORM SCALE WITH ASYMMETRICAL
LEVER ARMS USING TORSION PRINCIPLE
Arthur J. Burke, Oakland, and B A. Karas, Clifton, N.J.,
assignors to Howe Richardson Scale Company, Clifton,
N.J., a corporation of Delaware
Filed Sept. 16, 1965, Ser. No. 487,663
18 Claims. (Cl. 177—257)

This invention relates to platform scales and more particularly to improvements in platform type lever scales.

As is well known, equal corner ratios in platform scales are required in order to obtain accurate weighing measurements. A corner ratio of a platform scale lever system usually is defined as the quotient resulting from dividing the distance from the fulcrum knife edge to the load take off or tip knife edge by the distance from the fulcrum knife edge to the corner load knife edge. If the corner lever ratios in a platform scale are not equal, shifting of a load to different regions on the scale platform will result in a change in the indicated weight. For example, a scale nose iron may be adjusted so that the scale will accurately indicate the weight of a load when placed at one selected region on the scale platform. If the corner ratios of the scale are not closely equal, the indicated weight will change when the same load is shifted to another region on the scale platform with the result that the accuracy of the scale will objectionably be dependent upon the position of the load on the platform.

To obtain equal corner ratios in conventional platform scales, the lengths of the lever sections between fulcrum points, load points, and the take off point must be accurately held within very close tolerances and the various pivot connections must be closely parallel to each other and in alignment with symmetrically related pivot connections. For example, in a common triangularly shaped main lever of the type described in United States Letters Patent 1,012,303 issued to C. A. Videnghoff Dec. 19, 1911, any variation beyond close prescribed tolerances in any of the three distances between the fulcrum and take off points, any variation beyond close prescribed tolerances in any of the three angles included between the base and side sections of the triangular lever, any twist in the three sections of the lever, or any combination of the foregoing variations will make the corner ratios of the scale unequal. In addition, unequal distances between the lever fulcrum points and the lever load points will produce unequal corner ratios.

The adjustment of corner ratios for obtaining accurate measurements in conventional platform scales particularly of the type disclosed in the aforesaid Videnghoff patent is exceptionally difficult and adds considerably to the cost of manufacturing the scale. Usually, the corner ratios can be changed in the scale after manufacture only by carefully filing the various knife edges in the lever system.

The present invention has as one of its major objects the provision of a novel platform scale lever system which is easy and inexpensive to manufacture and which minimizes the number of lever arm distances critically affecting the corner ratios of the scale.

More specifically, an object of this invention is to provide a novel platform scale lever system having two lever assemblies each supporting an adjacent pair of corners of the scale platform and each formed with a pair of spaced, parallel arms joined only by a force transmitting torsion bar. One of the lever arms in one of the lever assemblies is operatively connected to a weight indicating device, such as, for example, a beam, and is also operatively tied to one lever arm in the other lever assembly. With this lever construction, it is only necessary (a) to make the distances between the four lever arm fulcrum points and their respective load receiving points equal and (b) to locate a force-transmitting, hanger connection between the two lever assemblies such that the distance between the point of connection to the lever arm in one assembly and the fulcrum point of the lever arm of said one assembly is equal to the distance between the point of connection to the lever arm in the other assembly and the fulcrum point of the lever arm in said other assembly.

Another object of this invention is to provide a novel knife edge and lever arm construction which enables the knife edges to easily and accurately be located in the lever assembly and which simplifies the manufacture of the lever arms and their assembly with the knife edges.

According to this invention, the lever assembly knife edges are formed with a uniform non-circular cross section and preferably a rectangular cross section and are interfittingly press fitted at opposite ends into mating, aligned apertures which are formed in lever arm sections preferably comprising flat-sided, elongated plates. In the assembly, the lever arm sections are disposed in parallel, spaced apart, side-by-side relation, and the knife edges extend essentially at right angles between the lever arm sections. The rectangularly cross-sectioned knife edges are easily and accurately located on the noses or the corners of the rectangular apertures in the lever arm sections. This eliminates the need for honing the faces of each knife edge to accurately align it with respect to the lever arm holes after it is assembled in place. This lever arm and knife edge construction also enables the knife edge receiving apertures to be inexpensively and readily stamped in the lever arm sections to assure the accurate and uniform location of the knife edges relative to each other.

Another important object of this invention is to provide a novel platform scale which may be assembled and disassembled easily and quickly and which prevents the assembled scale parts from being accidently dislodged or operatively disengaged as a result, for example, of shifting, tilting, or jarring the scale.

Still another object of this invention is to provide a novel platform support frame which assures the transmission of forces to all four corners of the lever system regardless of the location of the load on the scale platform. According to this aspect of the invention, the platform support frame is seated on knife edges at the four corners of the lever system and is constructed to twist or flex when off-center loads are applied to the platform to maintain engagement with the lever system knife edges.

Further objects of this invention will appear as the description proceeds in connection with the appended claims and the annexed drawings wherein:

Figure 1:
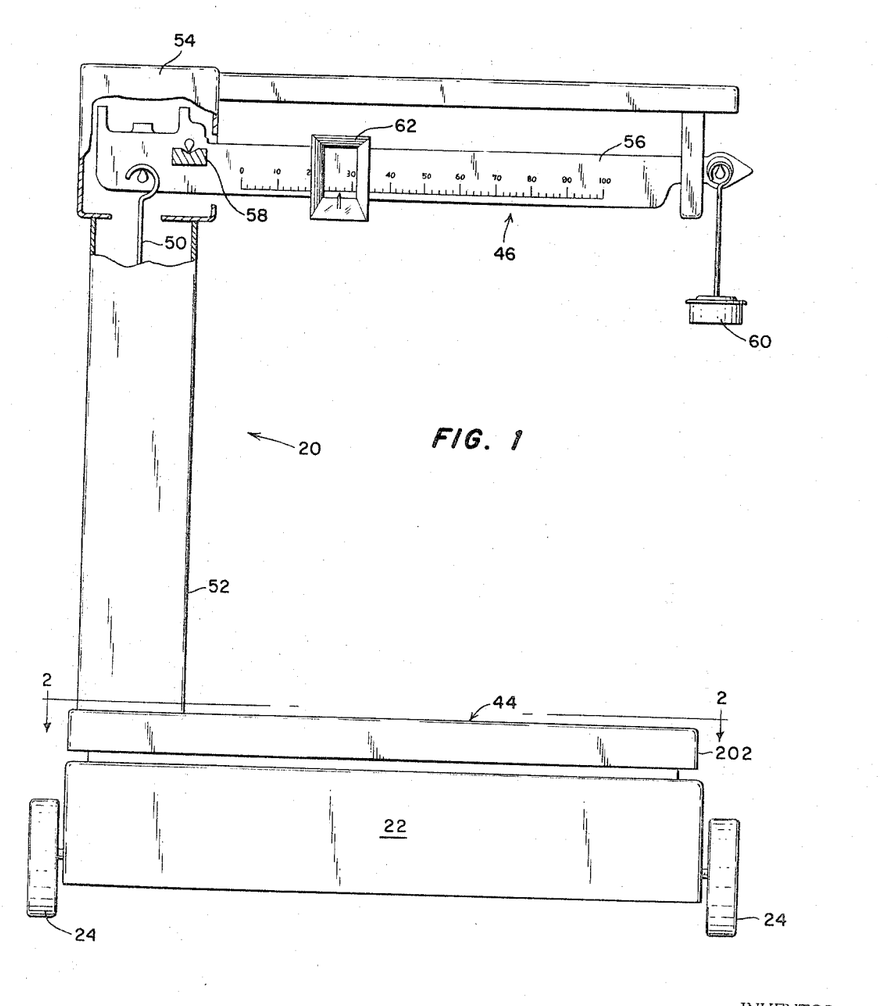
FIGURE 1 is a front elevation of a platform scale constructed according to this invention and having outer casing parts broken away to show interior details.
Figure 2:
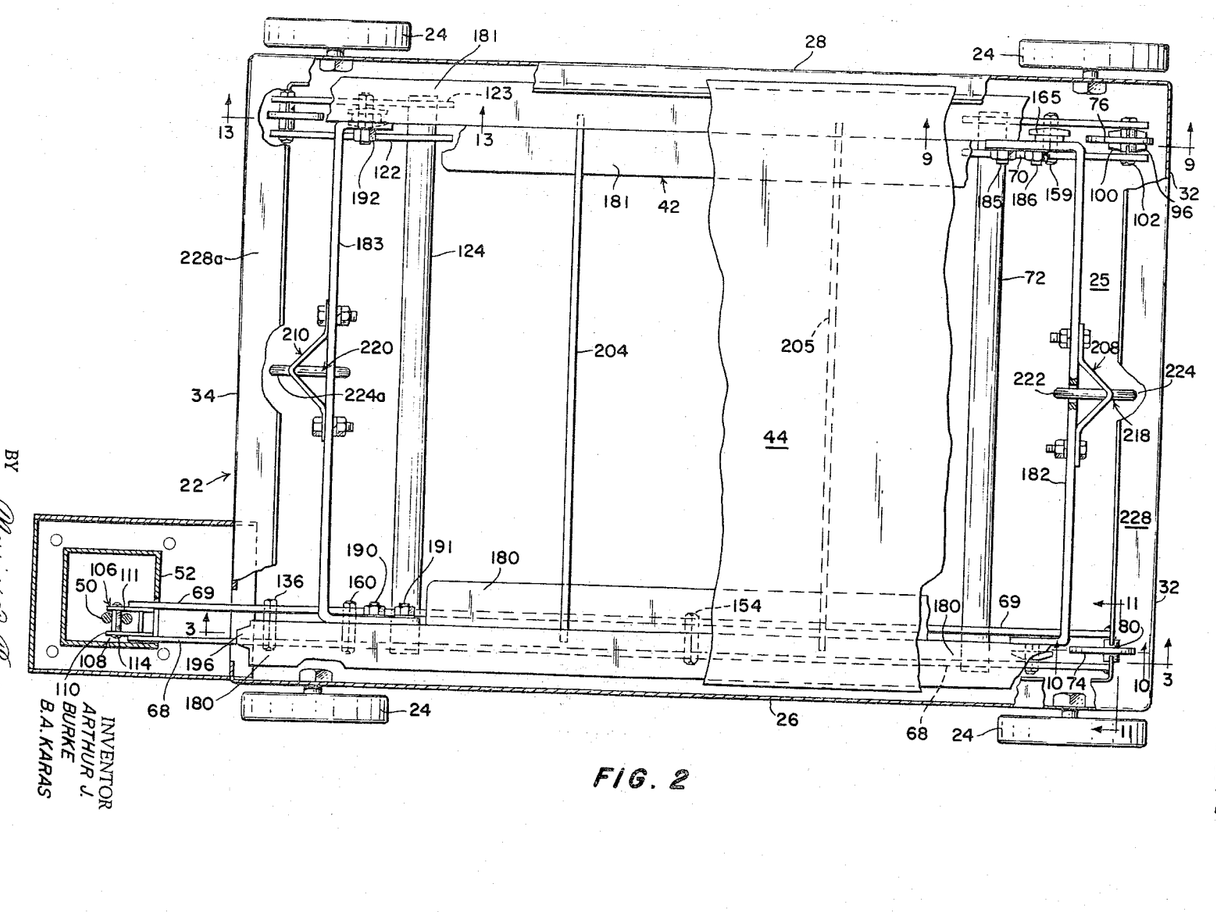
FIGURE 2 is a section taken substantially along lines 2—2 of FIGURE 1.

Referring now to the drawings and more particularly to FIGURES 1 and 2, the reference numeral 20 generally designates a portable platform scale constructed according to this invention and comprising a rigid rectangular base 22 rotatably mounting four wheels 24 about parallel axes. Wheels 24 are disposed two on each side of base 22 to support base 22 and the scale parts mounted thereon on a floor or other surface. This construction enables scale 20 to conveniently and easily be rolled from one location to another.

As shown in FIGURES 1-4, base 22 is in the form of a shell having an upwardly facing rectangular opening 25 defined by a pair of parallel, spaced apart side walls 26 and 28 rigidly joined together at opposite ends by parallel front and rear walls 32 and 34. The upper edges of walls 26, 28, 32, and 34 terminate in a common plane and delimit opening 25.

A lever system 40 disposed in the space confined by walls 26, 28, 32, 34 is hung from base 22 and mounts a frame 42. Supported on frame 42 is a load-receiving platform 44 extending over opening 25. The weight of a load applied to platform 44 is transmitted from lever system 40 to a weight indicating device 46 (see FIGURE 1) through a rod 50 which extends upwardly through a hollow, vertical pillar 52. Pillar 52 is rigidly supported on base 22 rearwardly of platform 44 and mounts at its upper end a hollow housing 54 for supporting weight indicating device 46.

Weight indicating device 46 may be of any suiatble, conventional form and is shown in this embodiment to comprise a balance beam 56 which is fulcrumed on housing 54 by a knife edge and bearing block assembly 58. Connected by suitable knife edge ebaring assemblies to beam 56 on opposite sides of its fulcrum axis is rod 50 and a counterweight 60. A poise 62 is slidable along beam 56 to balance a load placed on platform 44. Beam 56 is provided with a suitable indicia to indicate the weight balanced out by poise 62 in the usual manner.

As best shown in FIGURES 4-8 lever system 40 comprises a long lever assembly 64 and a short lever assembly 66. Lever assembly 64 is formed with a pair of flat-sided, long lever arms 68 and 69 and a pair of flat-sided short lever arms 70 and 71. Lever arms 68 and 69 are of identical construction, have the same dimensions, and extend in side-by-side, parallel, spaced apart relationship vertically below the left-hand side of frame 42 as viewed from FIGURE 4. Lever arms 70 and 71 also are of identical construction, have the same dimensions, and extend in parallel, side-by-side, spaced apart elation vertically below the right-hand side of frame 42 as seen from FIGURE 4.

Lever arms 68 and 69 extend rearwardly from the left front corner of platform 44 to the left rear corner of the platform. Lever arms 70 and 71 are parallel with lever arms 68 and 69 and extend only a short distance rearwardly from the right front corner of platform 44 in parallel with arms 68 and 69.

Figure 4:
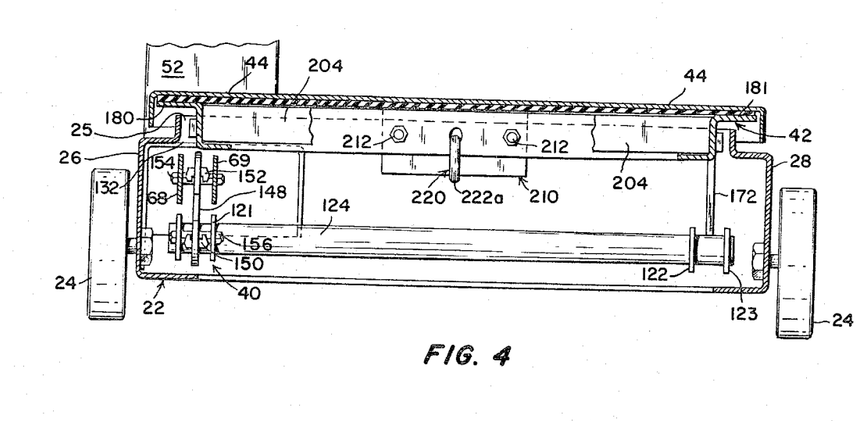
FIGURE 4 is a section taken substantially along lines 4—4 of FIGURE 3.

In accordance with this invention, lever arms 70 and 71, as best shown in FIGURES 2 and 4, are joined to lever arms 68 and 69 by a force-transmitting, torsion bar 72 which forms a part of assembly 64 and which extends transversely of arms 68-71 a short distance to the rear of the front edge of frame 42. Torsion bar 72 comprises a straight cylindrical rod, one end of which coaxially extends through axially aligned apertures in lever arms 68 and 69 and the other end of which coaxially extends through axially aligned apertures in lever arms 70 and 71. Torsion bar 72 is rigidly fixed to lever arms 68-71 as by welding. Thus, lever arms 68 and 69 are rigidly mounted as a unit on one end of torsion bar 72 and lever arms 70 and 71 are rigidly mounted as a unit on the other end of bar 72. Bar 72 transmits the forces applied to arms 70 and 71 to arms 68 and 69 in a manner to be described in detail later on.

Figure 3:
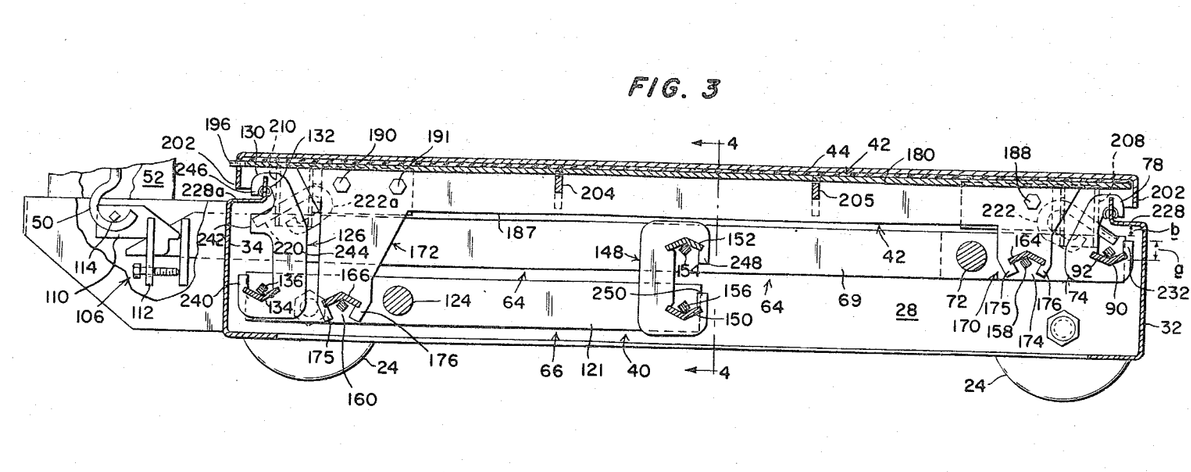
FIGURE 3 is a section taken substantially along lines 3—3 of FIGURE 2.
Figures 5, 9, 13:
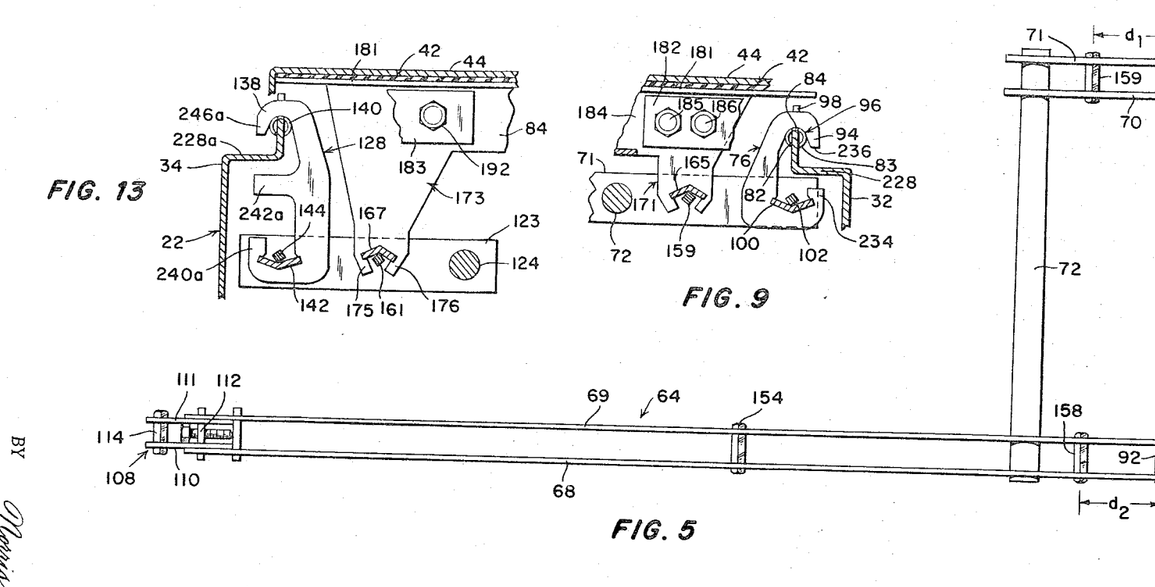
FIGURE 5 is a plan view of the long lever assembly shown in FIGURES 2–4.
FIGURE 9 is an enlarged, fragmentary section taken substantially along lines 9—9 of FIGURE 2.
FIGURE 13 is an enlarged, fragmentary section taken substantially along lines 13—13 of FIGURE 2.

As shown in FIGURES 3 and 9, lever assembly 64 is hung from front wall 32 of base 22 by a pair of C-shaped hangers 74 and 76. Hanger 74 is disposed at the forward left-hand corner of base 22 and comprises a flat-sided plate formed at its upper end with a hook portion 78 which seatingly engages over a replaceable wear bearing 80 removably mounted on the upper edge of front wall 32.

Figures 7, 10, 11, 12:
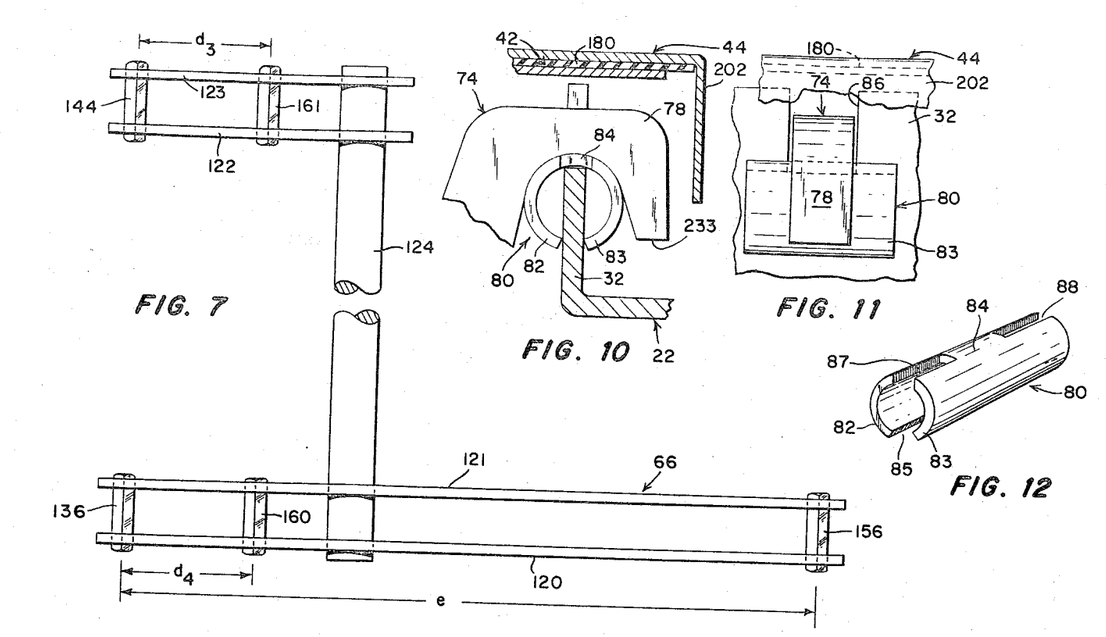
FIGURE 7 is a plan view of the short lever assembly shown in FIGURES 2–4.
FIGURE 10 is an enlarged, fragmentary section taken substantially along lines 10—10 of FIGURE 2.
FIGURE 11 is an enlarged, fragmentary section taken substantially along lines 11—11 of FIGURE 2.
FIGURE 12 is a perspective view of one of the wear bearing plates for supporting the lever system on the base of the scale.

As best shown in FIGURES 10-12, bearing 80 comprises a one-piece spring clip preferably made of stainless steel and having an elongated arcuate body in the form of a longitudinally slotted tube of uniform radius to define a pair of resilient, opposed arms 82 and 83 integrally joined at corresponding ends by a cross section 84. The lower ends of arms 82 and 83 delimit a longitudinal, open-ended, resilient mouth 85 through which the upper edge of front wall 32 extends.

As shown in FIGURES 10 and 11, front wall 32 is formed with an upwardly opening, straight-sided, flat-bottomed notch 86 which snugly receives section 84. Section 84 is formed with longitudinally aligning, oppositely opening, straight-sided slots 87 and 88 through which the portions of front wall 32 defining the side edges of notch 86 slidably extend. The relaxed width of mouth 85 is made somewhat smaller than the thickness of front wall 32 below notch 86 so that when bearing 80 is inserted over the bottom edge of notch 86, arms 82 and 83 are resiliently spread apart to snugly grip the inner and outer surfaces of wall 32 along interfaces extending longitudinally beyond both sides of notch 86.

As shown in FIGURE 11, the width of notch 86 is made sufficiently small to prevent objectionably lateral displacement of hanger 74. By extending both ends of arms 82 and 83 longitudinally beyond notch 86, the gripping interface between arms 82 and 83 and wall 32 is significantly increased to prevent bearing 80 from being angularly displaced or from twisting about a transverse axis. As a result, cross section 86 on which hanger 74 seats is securely retained in place to provide a firm bearing surface about which hanger 74 is adapted to swing. This construction of bearing 80, in addition to being readily replaceable without marring base 22, simplifies assembly of the scale since it is only necessary to push the bearing 80 down into notch 86 with sufficient pressure to spread arms 82 and 83. Bearing 80 is easily removable simply by pulling it upwardly out of notch 86. Owing to the resilience of arms 82 and 83 close tolerances of mouth 86 and of the thickness of wall 32 are not required to thereby reduce manufacturing costs.

With continuing reference to FIGURE 3, the lower portion of hanger 74 extends between lever arms 68 and 69 and mounts an upwardly opening V-shaped bearing plate 90 on which a pivot comprising a knife edge 92 is seated. Knife edge 92, according to this invention is formed from end to end with a uniform substantially square cross section and spans the space between arms 68 and 69 at essentially right angles thereto. The opposite ends of knife edge 92 are snugly and interfittingly received with press fits in aligning, substantially square apertures stamped in lever arms 68 and 69. The purpose of forming knife edge 92 with a square cross section and of forming lever arms 68 and 69 with interfitting apertures will be explained later on. As shown, knife edge 92 is disposed forwardly of torsion bar 72.

Hanger 76, as best shown in FIGURE 9, is of the same construction as hanger 74 and has an upper hook portion 94 which seats on a corner bearing 96. Corner bearing 96 is mounted in a notch 98 formed in front wall 32 adjacent to the right front corner of base 22. Bearing 96 and notch 98 are of the same construction and cooperate in the same manner as bearing 80 and notch 86. Accordingly, like reference numerals have been used to designate like elements.

The lower portion of hanger 76 extends between lever arms 70 and 71 and mounts a V-shaped bearing plate 100 on which a pivot comprising a knife edge 102 is seated. Knife edge 102 is of the same construction as knife edge 92 and is press fitted at opposite ends into interfitting substantially aligned, mating apertures stamped in lever arms 70 and 71 respectively. Thus it is clear that lever assembly 64 is hung from front wall 32 at the front corners of base 22. As will be explained in detail later on, knife edges 92 and 102, according to this invention, do not have to be closely parallel or in alignment with each other as is required in prior scale lever systems.

Figure 6:
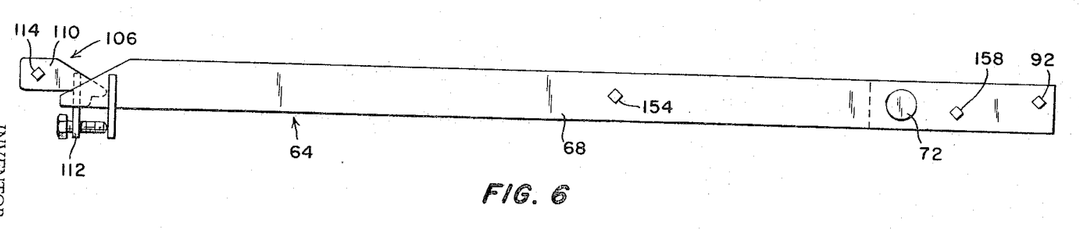
FIGURE 6 is a side elevation of the long lever assembly shown in FIGURE 5.

As best shown in FIGURES 2, 5 and 6, the rearward ends of lever arms 68 and 69 are connected to rod 50 by a nose iron assembly 106 of any suitable form and is shown to comprise a nose iron 108 formed with a pair of parallel, spaced apart, flat-sided plate sections 110 and 111 which are rigidly joined together by a pivot plate 112. Plate sections 110 and 111 are parallel with and form an extension of lever arms 68 and 69. A pivot comprising a knife edge 114 of the same construction as knife edges 102 and 92 is press fitted through interfitting, axially aligning apertures stamped in sections 110 and 111. Rod 50 is formed with a hooked end on which knife edge 114 is seated.

As is well known, nose iron assembly 106 is employed to adjust the lever arm length between knife edges 92 and 114 which acts on rod 50. This adjustment, it will be appreciated, equally affects all four corner ratios of the lever system and is not effective to vary any one of the corner ratios independently of the other corner ratios.

Figure 8:
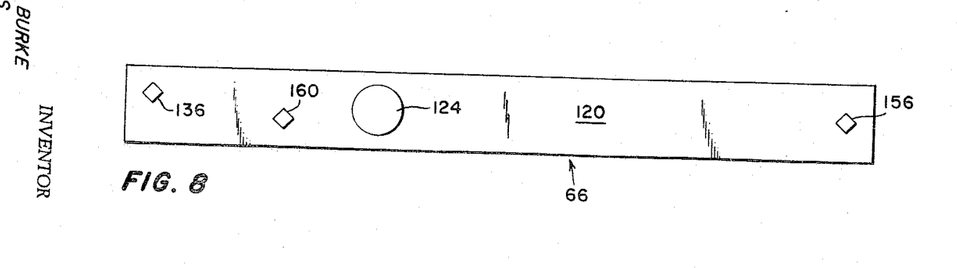
FIGURE 8 is a side elevation of the short lever assembly shown in FIGURE 7.

Referring now to FIGURES 7 and 8, the construction of lever assembly 66 is similar to that of assembly 64 and comprises a pair of flat-sided, long lever arms 120 and 121, a pair of flat-sided, short lever arms 122 and 123, and a torsion bar 124. Lever arms 120 and 121 are of identical construction and have the same dimensions. As shown in FIGURE 2, lever arms 120 and 121 are somewhat shorter than lever arms 68 and 69, extend forwardly from the left rear corner of frame 42 in parallel side-by-side relation, and are disposed vertically below and essentially parallel with lever arms 68 and 69 respectively. Lever arms 122 and 123 also are of identical construction and extend forwardly from the right rear corner of frame 42 in parallel relation with lever arms 120 and 121. Arms 122 and 123 are disposed in a plane vertically below lever arms 70 and 71. The lengths of arms 122 and 123 are essentially equal to the lengths of arms 70 and 71.

As shown in FIGURES 3, 4, 7, and 8, torsion bar 124 joins lever arms 120–123 together and comprises a straight cylindrical rod, one end of which snugly extends through aligned apertures in lever arms 120 and 121 and the other end of which snugly extends through aligned apertures in arms 122 and 123. Torsion bar 124 is rigidly fixed to lever arms 120–123 as by welding.

From the foregoing lever construction it is clear that lever arms 122 and 123 are rigidly mounted as a unit on one end of torsion bar 124 and lever arms 120 and 121 are rigidly mounted as a unit on the other end of bar 124. Bar 124 transmits forces applied to lever 122 and 123 to lever arms 120 and 121.

As shown in FIGURES 3 and 13 lever assembly 66 is suspended from rear wall 34 of base 22 by a pair of generally C-shaped hangers 126 and 128. Hanger 126 is disposed at the left rear corner of base 22 and comprises a flat-sided plate formed at its upper end with a hook portion 130 which seatingly engages over a corner bearing 132. Bearing 132 is of the same construction as bearing 80 and is seated in an upwardly opening notch formed in the upper edge of rear wall 34.

The lower hooked end of hanger 126 removably mounts an upwardly opening V-shaped bearing plate 134 on which a pivot comprising a knife edge 136 is seated. Knife edge 136 is of the same construction as knife edge 92 and has a uniform, substantially square cross section from end to end. As shown, knife edge 136 spans the space between lever arms 120 and 121 at essentially right angles thereto and has its opposite ends respectively press fitted into axially aligned, interfitting apertures stamped in arms 120 and 121.

Referring to FIGURE 13, hanger 128 also comprises a flat-sided plate formed at its upper end with a hook portion 138 which seatingly engages over a removable wear bearing 140. Bearing 140 is of the same construction as bearing 80 and is seated in an upwardly opening notch formed in the upper edge of rear wall 34 adjacent to the right rear corner of base 22. The lower hooked end of hanger 128 removably mounts a V-shaped bearing plate 142 on which a pivot comprising a knife edge 144 is seated. Knife edge 144 also is of the same construction as knife edge 92, having a uniform substantially square cross section from end to end and spanning the space between lever arms 122 and 123 at essentially right angles thereto. The opposite ends of knife edge 144 are press-fitted into interfitting, axially aligned apertures stamped in lever arms 122 and 123 respectively. As shown, torsion bar 124 is fixed to lever arms 120–123 at regions spaced forwardly of knife edges 136 and 144. Lever assembly 66 thus is pivotable about knife edge axes extending below the rearward end of platform 44, while lever assembly 64 is pivotable about knife edge axes extending below the forward end of platform 44. It is to be pointed out that knife edges 136 and 144 are not required to be closely parallel or in alignment with each other or closely parallel to knife edges 92 and 102 to achieve accurate weight measurements for reasons to be explained later on.

As shown in FIGURES 2 and 3, lever arms 120 and 121 each are about one-half the lengths of lever arms 68 and 69 and are hung at their forward ends from arms 68 and 69 by a C-shaped, flat-sided hanger 148. The lower end of hanger 148 extends between lever arms 120 and 121 and removably mounts an upwardly opening V-shaped bearing plate 150. The upper end of hanger 148 extends between lever arms 68 and 69 and also removably mounts a downwardly opening V-shaped bearing plate 152. Bearing plate 152 is seated on a pivot comprising a knife edge 154 which is of the same construction as knife edge 92, having a uniform, substantially square cross section from end to end. As shown, knife edge 154 extends essentially at right angles between lever arms 68 and 69 and is press fitted at opposite ends into interfitting, axially aligned apertures respectively stamped in arms 68 and 69. Knife edge 154 is thus fixed to lever arms 68 and 69 between the iron nose connection to rod 50 and torsion bar 72. Torsion bar 72 is joined to lever arms 68 and 69 between knife edge 154 and knife edge 92.

With continued reference to FIGURES 3 and 4, a pivot comprising a knife edge 156 is seated on bearing plate 150 and is of the same construction as knife edge 154, having a uniform, substantially square cross section from end to end. Knife edge 156 extends essentially at right angles between lever arms 120 and 121 and is press fitted at opposite ends into interfitting, axially aligned apertures stamped in arms 120 and 121 respectively. Torsion bar 124 is fixed to lever arms 120 and 121 between knife edges 136 and 156 as shown. Thus, the corresponding, rigidly joined free ends of arms 120 and 121 are supported from knife edge 154 on arms 68 and 69.

Referring now to FIGURES 2, 9 and 13, four knife edges 158, 159, 160 and 161 of the same construction as knife edge 92 are provided for supporting frame 42 on lever assemblies 64 and 66. Knife edge 158, as best shown in FIGURE 5, extends essentially at right angles between lever arms 68 and 69 and is press fitted at opposite ends into mating, axially aligned apertures stamped in arms 68 and 69 respectively. Knife edge 159 is in at least approximate alignment with knife edge 158 and extends essentially at right angles between lever arms 70 and 71. The opposite ends of knife edge 159 are press fitted into mating, axially aligned apertures stamped in arms 70 and 71 respectively. Knife edges 158 and 159 are disposed between torsion bar 124 and the lever assembly pivot axis provided by knife edges 92 and 102. Knife edges 158 and 159 are not required to be closely parallel or in alignment with each other or in close parallel relation with the other previously mentioned knife edges.

As best shown in FIGURE 7, knife edge 160 extends essentially at right angles between lever arms 120 and 121. The opposite ends of knife edge 160 are press fitted into mating, axially aligned apertures stamped in lever arms 120 and 121 respectively. Knife edge 161 is at least approximately in alignment with knife edge 160 and is press fitted at its opposite ends in mating, aligned apertures stamped in lever arms 122 and 123 respectively. Knife edges 160 and 161 are disposed between torsion bar 124 and the lever assembly pivot axis provided by knife edges 136 and 144. As mentioned with respect to the previous knife edges, knife edges 160 and 161 are not required to be closely parallel or in alignment with each other or in close parallel relation with the other knife edges in the lever system to obtain accurate weight measurement with the scale of this invention.

With continuing reference to FIGURES 3, 9, and 13, downwardly opening V-shaped bearing plates 164, 165, 166, and 167 are respectively seated on knife edges 158, 159, 160, and 161. Bearing plates 164, 165, 166, and 167 are respectively removably mounted on parallel legs 170, 171, 172, and 173 extending downwardly from the four corners of frame 42.

Figure 15:
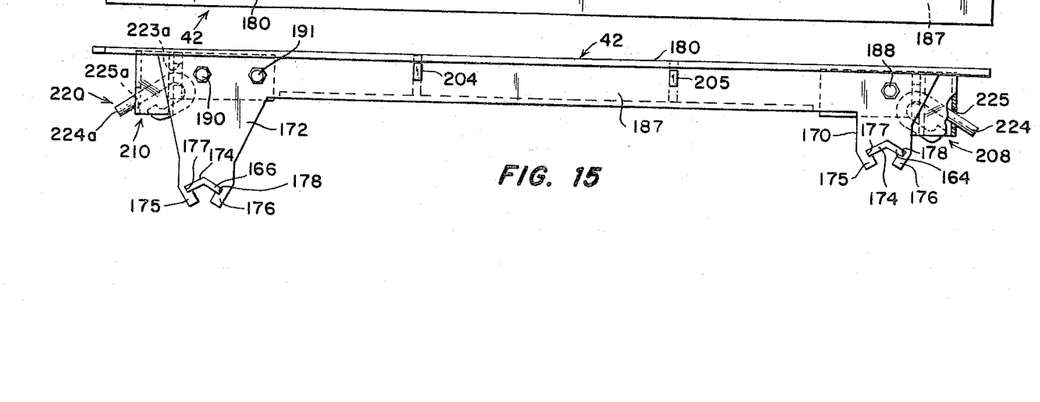
FIGURE 15 is a side elevation of the frame shown in FIGURE 14.

As best shown in FIGURES 15, leg 170 is formed with a downwardly opening notch 174 to form narrow arm portions 175 and 176 which respectively have parallel, opposed, open-ended grooves 177 and 178 at the inner end of the notch. Bearing plate 164 is formed with opposite facing notches that matingly engage in grooves 177 and 178. In accordance with this invention, leg 170 is relatively thin and flat sided to enable one or other of the arm portions 175 and 176 to be bent inwardly toward the center of notch 174 to securely clamp bearing plate 164 in place between opposed side surfaces of grooves 177 and 178. Legs 171–173 are of the same construction as leg 170, like reference numerals being used to identify like elements.

When a load is applied to platform 44 to exert a downward force, $f_1$, for example, on knife edge 159 at the right, front corner of base 22, the reaction at knife edge 102 is a couple equal to the magnitude of the force $f_1$ times the distance $d_1$ (see FIGURE 5) between knife edges 159 and 102. The deflection of lever arms 70 and 71 as a result of applying force $f_1$ to knife edge 159 is so slight that it has no consequential effect on the lever arm distance $d_1$. Since torsion bar 72 provides the only path for transmitting this force couple to lever arms 68 and 69, it is clear that the twisting moment applied to torsion bar 72 as a result of applying force $f_1$ to knife edge 159 equals the reaction at knife edge 102 or, more particularly, the force couple $f_1 d_1$. The twisting moment at the end of torsion bar 72 connected to arms 70 and 71 is the product of the tangential twisting force at torsion bar 72 and the diameter of the torsion bar. This twisting moment is opposed by a resisting moment at the opposite end of torsion bar 72 connected to lever arms 68 and 69, and this resisting moment, under equilibrium or static balancing conditions, will be equal to the twisting moment. The resisting moment is transposed into couple reacting at knife 92 to apply a downward pull on rod 50. In this manner, the force applied at knife edge 159 is effectively transmitted to lever arms 68 and 69 for summing up with the other loads applied to arms 68 and 69.

From the foregoing analysis it is clear that the force couple $f_1 d_1$ reacting at knife edge 102 is equal to the twisting moment applied to twist torsion bar 72 and that the twisting moment, in turn, is equal and opposite to the resisting moment at the opposite end of torsion bar 72. Accordingly, the only lever arm distance involved in determining the magnitude of force couple $f_1 d_1$ and, consequently, the twisting and resisting moments applied to torsion bar 72 is the distance $d_1$ between knife edges 102 and 159. The force couple $f_1 d_1$ and the resulting twisting and resisting moments therefore are completely independent of the distance between knife edge 102 and the center of torsion bar 72. As a result, the corner ratio at knife edge 102 is only dependent upon the distance $d_1$. Torsion bar 72, therefore, may be fixed to lever arms 70 and 71 at any selected distance relative to knife edge 102 without affecting the corner ratio at knife edge 102. Since the resulting force couple reacting at knife edge 92 equals the force couple $f_1 d_1$ under equilibrium conditions, it is clear that the distance between knife edge 92 and the center of torsion bar 72 does not affect the force applied rod 50. As a consequence, torsion bar 72 may be fixed at any selected angle with respect to lever arms 68–71.

Assuming that the load on platform 44 applies force $f_2$ to knife edge 158, the reaction at knife edge 92 for transmitting a force to rod 50 is a couple equal to the product of force $f_2$ and the distance $d_2$ between knife edges 92 and 158. The force couple $f_2 d_2$ swinging lever arms 68 and 69 in a counterclockwise direction as viewed from FIGURE 3 is opposed by a force couple equal to the product of the balancing force applied through rod 50 and the distance between rod 50 and knife edge 92. Thus, it is clear that only the distance $d_2$ is critical in establishing the scale corner ratio at the front, left-hand corner of the lever system.

The force $f_3$ applied at knife edge 161 by the load on platform 44 produces a force couple reacting at knife edge 144 and equal to the product of the force $f_3$ and the distance $d_3$ between knife edges 144 and 161. Since torsion bar 124 provides the only path for transmitting this force couple $f_3 d_3$ to lever arms 120 and 121, it is clear that the twisting movement applied to torsion bar 72 equals the reaction at knife edge 144, or, more particularly, force couple $f_3 d_3$ in the same manner as explained with respect to lever assembly 64. Accordingly, the corner ratio at knife edge 144 depends only upon the distance $d_3$ and is independent of the distance between knife edge 144 and the center of torsion bar 124. As a consequence, torsion bar 124 may be fixed to lever arms 122 and 123 at any selected distance from knife edge 144.

The resisting torque on torsion bar 124 resulting from the application of a force to knife edge 161 is transposed into a couple which reacts at knife edge 136 with a lever arm equal to the distance between knife edges 136 and 156. Thus, the distance between knife edges 136 or 160 and the center of torsion bar 124 at the end which is connected to lever arms 120 and 121 does not affect any of the scale corner ratios. Torsion bar 124 therefore may be fixed at any selected angle with respect to lever arms 120–123 in the same manner as described with respect to torsion bar 72 in lever assembly 64.

The force couple produced by applying a twisting moment to torsion bar 124 and reacting at knife edge 136 is summated with the couple produced by applying a force $f_4$ to knife 160. This latter couple is the product of force $f_4$ and the distance $d_4$ between knife edges 136 and 160. The force couple $f_4d_4$ and the couple resulting from applying a twisting moment to torsion bar 124 are opposed by a force couple equal to the product of distance $e$ (see FIGURE 7) between knife edges 136 and the force applied through hanger 148. The corner ratios at knife edges 136 and 144 in lever assembly 66 thus are only dependent respectively upon distances $d_4$ and $e$ and distances $d_3$ and $e$.

To make all of the four corner ratios equal in accordance with this invention, therefore, it is only required to make distances $d_1$, $d_2$, $d_3$ and $d_4$ equal to each other, to make distance $e$ equal to the distance between knife edges 92 and 154 since the force couple reacting at knife edge 102 is transmitted to lever arms 68 and 69 only through torsion bar 72 and the force couple reacting at knife edge 144 is transmitted to lever arms 120 and 121 only through torsion bar 124. By making the distance $e$ equal to the distance between knife edges 92 and 154, these lever arm lengths cancel each other out in the moment applied to lever arms 68 and 69. Thus, in comparison with prior platform scale lever constructions the number of lever arm distances critically affecting the scale corner ratios are considerably reduced. Since only the distances $d_1$, $d_2$, $d_3$, and $d_4$ are required to be equal to each other, it is further apparent that the knife edges in lever assemblies 64 and 66 are not required to be closely parallel with each other, that knife edges 102 and 159 are not required to be in close axial alignment with knife edges 92 and 158, and that knife edges 144 and 161 are not required to be in close axial alignment with knife edges 136 and 160.

Forming knife edges 92, 102, 114, 136, 144, 154, 156, and 158–161 with square cross sectioned ends and providing their respective lever arm apertures with mating square configurations, enables knife edges 92, 102, 114, 136, 144, 154, 156 and 158–161 to be accurately and easily located on the noses or corner of the square apertures into which they are press-fitted. Thus, each of the knife edges in lever assemblies 64 and 66 are properly located with respect to their lever arm apertures during assembly. This eliminates the need for honing the knife edge surfaces to line up each knife edge with respect to its associated apertures in the lever arms.

The foregoing lever arm and knife edge construction also enables the apertures to be stamped in lever arms 68–71 and 120–123 by a suitable punching machine. Moreover, only one arrangement of aperture forming punches is needed to provide all of the knife edge receiving apertures in lever arms 68–71 and 120–123. To this end, the punches are arranged to punch out the apertures in lever arms 68 and 69 which, as previously mentioned, are of identical construction. To form the apertures in lever arms 70, 71, 122 and 123, arms 70, 71, 122 and 123 are each inserted into the machine to be engaged by the punches employed for forming the apertures receiving knife edges 92 and 158 on lever arms 68 and 69. To form the apertures in lever arms 120 and 121, arms 120 and 121 are each inserted into the punching machine to be engaged by the punches used to form the apertures receiving knife edges 92, 158, and 154. Forming all of the knife edge receiving apertures on the same machine and with the same fixed arrangement of punches in this manner assures that the distances $d_1$, $d_2$, $d_3$, and $d_4$ are equal and that the distance $e$ equals the distance between knife edges 154 and 92. Thus, the particular construction of the lever assemblies enabling the knife edge apertures to be stamped out with the same arrangement of punches provides for the needed accuracy in the dimensions critically affecting the corner ratios of the scale of this invention. Construction of the lever assemblies in this manner thereby provides an inexpensively manufactured scale that is capable of accurate weight measurements.

Figure 14:
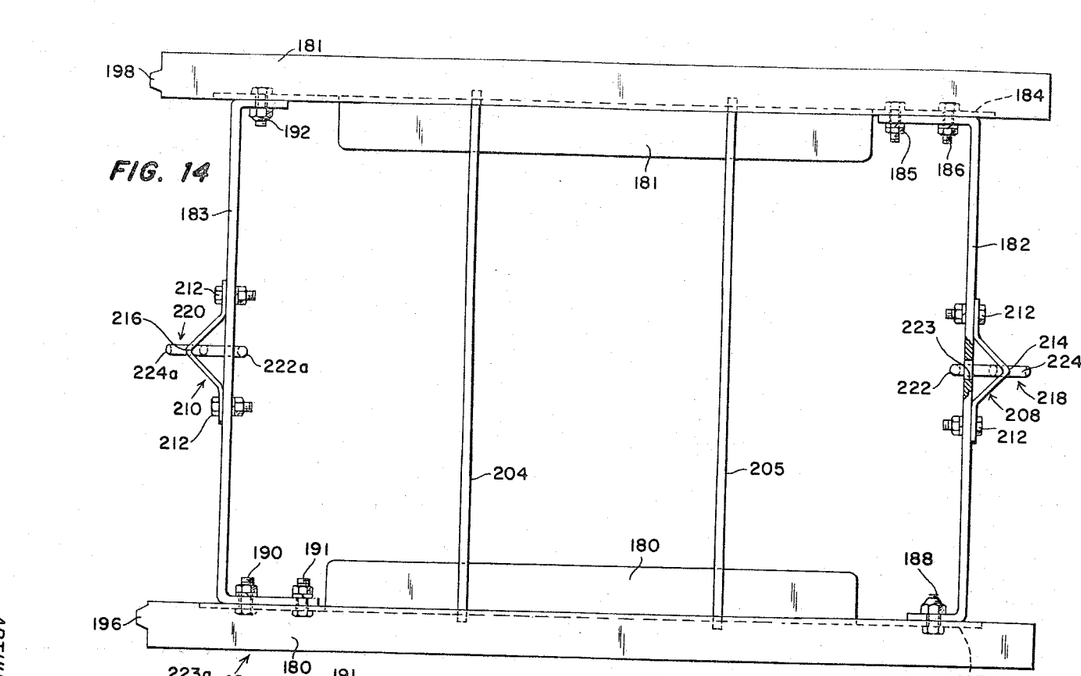
FIGURE 14 is a plan view of the inner, platform support frame shown in FIGURES 2-4.

As shown in FIGURES 2, 3, and 14, frame 42 comprises a pair of parallel, spaced apart side plates 180 and 181 which are interconnected by parallel spaced apart front and rear transverse plates 182 and 183 to form a rectangular frame construction. Preferably, legs 170 and 172 are formed integral with side plate 180, and legs 171 and 173 are formed integral with side plate 181.

Plate 182 is rigidly fixed to a depending flange portion 184 of side plate 181 by a pair of nut and bolt assemblies 185 and 186. At its opposite end, plate 182 is secured to a depending flange portion 187 of side plate 180 by a single nut and bolt assembly 188 to provide a non-rigid connection. Nut and bolt assemblies 185 and 186 thus provide a stiff connection between plates 181 and 182 at the front right-hand corner of frame 42, while nut and bolt assembly 188 provides a relatively soft, pivotal connection between plates 180 and 181 at the front left-hand corner of frame 42 for a purpose to be explained shortly.

Plate 183 is rigidly fixed to the depending flange portion 187 of side plate 180 by a pair of nut and bolt assemblies 190 and 191. The opposite end of plate 183 is secured to the flange portion 184 of side plate 181 by a single nut and bolt assembly 192 to provide a non-rigid connection. Thus, nut and bolt assemblies 190 and 191 provide a stiff connection between plates 180 and 183 at the left rear corner of frame 42 diagonally opposite the stiff connection between plates 181 and 182, and nut and bolt assembly 192 provides a relatively soft, pivotal connection between plates 181 and 183 at the right rear corner of frame 42 diagonally opposite the pivotal connection between plates 180 and 182. With this combination of stiff and pivotal connections between plates 180–183 frame 42 twists or flexes, essentially about a diagonal line passing through its left front and right rear corners when a load is eccentrically applied to platform 44 as at one of the corners thereof. As a result of allowing frame 42 to be twisted by such off-center loads, bearing plates 164–167 are maintained in seating engagement with knife edges 158–161 to assure transmittal of forces to all four corners of the lever system while maintaining frame 42 longitudinally stiff along side plates 180 and 181.

Platform 44 is seated on frame 42 and is made of sheet metal which is sufficiently thin as to enable its weight to cause the load-receiving platform surface to follow the twisting movement of frame 42. Advantageously, a thin sheet of resilient material may be disposed between the underside of platform 44 and the top of frame 42. Thus, complete transmission of forces is assured through positively engaging surfaces regardless of the location of the load on platform 44.

As best shown in FIGURES 3 and 14, side plates 180 and 181 are preferably formed of sheet metal and have rearwardly extetnding, flat-sided keeper tongues 196 and 198 which respectively extend through laterally spaced apart slots 200 (one shown). Slots 200 are formed in an integral depending skirt portion 202 of platform 44. Tongues 196 and 198 are adapted to abuttingly engage the edges of slots 200 to prevent the rearward end of platform 44 from tilting upwardly when a load is applied near or at its forward end.

As shown in FIGURES 3, 14 and 15 a pair of longitudinally spaced apart, parallel webs 204 and 205 comprise thin, flat-sided plates which extend transversely between side plates 180 and 181 for supporting the load receiving surface of platform 44. The opposite ends of webs 204 and 205 are mounted in slots formed in flange portions 184 and 187 of side plates 181 and 180 respectively.

Referring to FIGURES 2, 3, 14 and 15, frame 42 is provided with a pair of rigid bumper plates 208 and 210 fixed by nut and bolt assemblies 212 to vertical sections of plates 182 and 183 respectively. Bumper plates 208 and 210 are disposed about midway between side plates 180 and 181 and are V-shaped, having nose portions 214 and 216 which respectively extend forwardly of front plate 182 and rearwardly of rear plate 183. Nose portions 214 and 216 are adapted to abuttingly engage walls 32 and 34 of base 22 to limit horizontal displacement of frame 42 in forward and rearward directions.

To limit upward displacement of frame 42, a pair of locking pins 218 and 220 are mounted on plates 182 and 183 respectively. Locking pin 218 is provided with a looped end section 222 extending freely through an aperture 223 (see FIGURE 14) formed in plate 182 and encircling the portion of plate 182 below aperture 223. Aperture 223 is shown to longitudinally align with nose portion 214 of bumper plate 208.

As best shown in FIGURES 14 and 15, locking pin 218 is formed with a straight end section 224 extending forwardly and downwardly from aperture 223 and passing freely through a longitudinally aligning aperture 225 formed in nose portion 214. The looped end section 222 retains locking pin 218 on plate 182 and is dimensioned to allow limited longitudinal movement of the locking pin along the axis of end section 224.

As best shown in FIGURES 2 and 3, section 224 of locking pin 218 extends forwardly beyond nose portion 214 and beneath an inwardly extending, horizontal ledge portion 228 of front wall 32. End section 224 of pin 218 is spaced a short distance below the rearward end of ledge portion 228 as shown in FIGURE 3. Abutment of section 224 with ledge portion 228 limits upward displacement of tilting movement of the forward end of frame 42.

Locking pin 220 and the parts of frame 42 and base 22 cooperating therewith are the same as that just described for locking pin 218. Accordingly, like reference numerals have been used to designate like parts except that the reference numerals identifying the portions of pin 220 and parts associated therewith have been suffixed with the letter a. Pin 220 cooperates with ledge portion 228a for limiting upward displacement or tilting movement of the rearward end of frame 42 in the same manner described with respect to locking pin 218. Ledge portion 228a, as shown in FIGURE 3, is formed in rear wall 34 of base 22.

To remove frame 42 from its assembled position shown in the drawings, platform 44, which is separably seated on frame 42, is removed and locking pins 218 and 220 are pulled toward each other by gripping the looped end sections 222 and 222a to withdraw end sections 224 and 224a from beneath ledge portions 228 and 228a. Still gripping looped sections 222 and 222a, frame 42 is then lifted upwardly from seating engagement on lever assemblies 66 and 68. It will thus be appreciated that pins 218 and 220 provide a simplified, easily manipulatable construction for locking frame 42 in place and for quickly removing frame 42 from the assembly of scale parts.

In accordance with this invention, the forward ends of lever arms 68–71 of assembly 64 extend beneath ledge portion 228 and are spaced vertically below ledge portion 228 by a distance b (see FIGURE 3) when the scale parts are in the positions shown in FIGURES 2–4. Upward displacement of lever assembly 64 is thus limited by abutment of the upper edges of lever arms 68–71 with the underside of ledge portion 228.

With continued reference to FIGURE 3, hanger 74 is formed at its lower end with an upward locking extension 232 having a length a extending vertically between its upper edge and the knife edge surface engaging bearing plate 90. Length a is appreciably longer than distance b with the result that the lower end of hanger 74 does not become separated or dislodged from operative engagement with lever assembly 64 when assembly 64 is deliberately or inadvertently displaced upwardly to the position limited by abutment of lever arms 68–71 with the underside of ledge portion 228.

In the assembled relation of parts shown in FIGURE 2, upward displacement of hanger 74 along with lever assembly 64 is limited by abutment of the upper edge of the hanger hook portion 78 with the portion of plate 180 extending horizontally outwardly from the depending flange portion 187. The free end of hook portion 78 is made sufficiently long that its lower edge 233 (see FIGURE 10) does not clear wear bearing 80 which hanger 74 is displaced to its upward limiting position where the upper edge of hanger 74 butts against the underside of side plate 180.

As shown in FIGURE 9, hanger 76 is similarly formed with a locking extension 234 which is made sufficiently long that its upper edge does not clear the lower edge of knife edge 102 when lever assembly 64 is displaced upwardly to its limiting position where lever arms 68–71 butt against the underside of ledge portion 228. The end of hook portion 94 also is made sufficiently long that its downwardly facing edge 236 does not clear wear bearing 96 when hanger 76 is displaced upwardly to its limiting position where the upper edge of hanger 76 butts against the horizontal portion of side plate 181.

The foregoing locking construction thus prevents hangers 74 and 76 from becoming dislodged or operatively disengaged when the scale is jarred, tilted, or shifted.

To unhook hangers 74 and 76, platform 44 and frame 42 must first be removed. Removal of frame 42 enables lever assembly 64 to be shifted horizontally toward the rear end of base 22 to tilt the lower ends of hangers 74 and 76 rearwardly and upwardly. When the parts of lever assembly 64 are in these positions, lever arms 68–71 are pushed upwardly enabling the lower ends of hangers 74 and 76 to clear knife edges 92 and 102 and thus to be swung in a counterclockwise direction as viewed from FIGURES 2 and 9 to disconnect them from lever assembly 64. Frame 42 must first be removed before hangers 74 and 76 can be removed since bumper plate 210 does not permit lever assembly 64 to be shifted rearwardly by a sufficient distance to allow hangers 74 and 76 to be tilted to the angle needed for enabling the upper edges of locking extensions 232 and 234 to clear knife edges 92 and 102.

As shown in FIGURE 3, upward displacement of lever assembly 66 is limited by abutment of the upper edges of lever arms 120 and 121 with the lower edges of lever arms 68 and 69 extending vertically above arms 120 and 121. To prevent hanger 126 from becoming unhooked from knife edge 136 if lever assembly 66 is inadvertently displaced to its upper limiting position, the lower end of hanger 126 is formed with an upstanding locking extension 240. Extension 240 is made sufficiently long that its upper edge does not clear the lower surface of knife edge 136 when lever assembly 66 is lifted to a position where lever arms 120 and 121 butt against the lower edges of lever arms 68 and 69.

Still referring to FIGURE 3, hanger 126 is formed with a lateral projection 242 extending rearwardly from the intermediate body portion 244 of hanger 126. The upper edge of projection 242 is spaced vertically below ledge portion 228a and is adapted to butt against the underside of ledge portion 228a to limit upward displacement of hanger 126. Hook portion 130 is formed with a downward locking extension 246 that is longer than the vertical distance between the upper edge of projection 242 and the underside of ledge portion 228a when knife edge 136 is seated on bearing plate 134 in the assembly of parts shown in FIGURE 3. Thus, the lower edge of locking extension 246 does not clear wear bearing 132 when hanger 126 is lifted upwardly to a position limited by abutment of projection 242 with the underside of ledge 228a. From the foregoing construction it is clear that extensions 240 and 246 and projection 244 cooperate to prevent hanger 126 from becoming accidently dislodged when the scale parts are assembled in the manner shown in FIGURE 3.

As shown in FIGURE 13, hanger 128 is formed with locking extensions 240a and 246a and a lateral projection 242a which are respectively of the same construction as extensions 240 and 246 and projection 242 and which perform the same functions described for extensions 240 and 246 and projection 242 to prevent hanger 128 from becoming dislodged from operative engagement with knife edge 144 or wear bearing 140.

To remove hangers 126 and 128 platform 44 and frame 42 first must be removed. By removing frame 42, lever assembly 66 may be shifted forwardly to tilt the lower ends of hangers 126 and 128 forwardly and upwardly. With hangers 126 and 128 in these tilted positions, lever assembly 66 is raised a sufficient distance to allow locking extensions 240 and 240a to clear knife edges 136 and 144 with the result that hangers 126 and 128 can be swung forwardly and upwardly to disengage from knife edges 136 and 144 and from base 22. If frame 42 is not removed, abutment of bumper plate 208 with base 22 prevents lever assembly 66 from being shifted a sufficient distance forwardly to tilt hangers 126 and 128 to positions where they can be unhooked from knife edges 136 and 144 when lever assembly 66 is raised.

With continued reference to FIGURE 3, hanger 148 is formed with upper and lower vertical locking extensions 248 and 250. Locking extension 250 is made sufficiently long so that it does not clear knife edge 156 if lever assembly 66 is lifted upwardly to butt against lever assembly 64. Locking extension 248 is made sufficiently long that it does not clear knife edge 154 if hanger 248 is lifted with lever assembly 66 to a limiting position where lever arms 120 and 121 butt against lever arms 68 and 69. Upward displacement of hanger 148 is also limited by abutment of its upper edge with the lower edge of flange portion 187. Thus, in the assembly of parts shown in FIGURE 3, hanger 148 also cannot be inadvertently dislodged from operative engagement with lever assemblies 64 and 66.

From the foregoing cooperation of scale parts it will be appreciated that lever assemblies 64 and 66 and hangers 74, 76, 126, 128, and 148 cannot be dislodged accidently and are easily disassembled and assembled.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a platform scale having a weight indicating device, a pair of lever assemblies operatively connected to each other and each having a torsion member and a pair of spaced apart lever arms fulcrumed about separate pivot axes, one lever arm of one of said lever assemblies adapted to be operatively connected to said weight indicating device, a load-supporting platform, and means supporting said platform on the lever arms of each of said lever assemblies at predetermined lever arm distances from the pivot axes thereof, said lever arms of each assembly being joined together only by said torsion member, whereby the force couple produced by applying a load to said platform and reacting at the pivot axis of one of said lever arms is transmitted only as a twisting moment to the other lever arm in each assembly.

2. The platform scale defined in claim 1 wherein said platform is supported on the lever arms of said assemblies at equally spaced distances from the pivot axes thereof.

3. The platform scale defined in claim 2 comprising force transmitting means operatively connecting the free, deflectible end of one arm of the other of said lever assemblies to the lever arm in said one assembly that is operatively connected to said weight indicating device, the lever arm distance between the connection of said force transmitting means to said one arm of said other assembly and the pivot axis thereof being equal to the lever arm distance between the connection of said force transmitting means to said one lever of said one lever assembly and the pivot axis thereof.

4. The platform scale defined in claim 3 wherein the lever arms in both of said lever assemblies are substantially straight and parallel.

5. The platform scale defined in claim 3 wherein said force transmitting means is the sole operative connection between said lever assemblies and comprises pivot means supportingly suspending the deflectible end of said one lever of said other lever assembly from said one lever arm of said one lever assembly.

6. The platform scale defined in claim 1 wherein said means supporting said platform on said lever assemblies comprises a quadrilateral frame on which said platform is seated, said frame being twistable about a diagonal line passing through opposed corners thereof and being rigid in a direction extending transversely of the lever arm pivot axes.

7. The platform scale defined in claim 6 comprising pivot means supporting said frame on each lever arm of each of said assemblies, said platform being seated on said frame.

8. The platform scale defined in claim 1 comprising a base, hanger means independently supporting said lever arms of both assemblies from said base for deflection about said pivot axes, a removable frame forming a part of said means supporting said platform on said lever assemblies, means for preventing operative disengagement of said hanger means from lever assemblies except by removal of said frame.

9. The platform scale defined in claim 8 comprising locking means for releasably limiting vertical displacement of said frame relative to said base.

10. The platform scale defined in claim 9 wherein said locking means comprises a pair of pins mounted on said frame and being abuttable with said base, said pins being manually displaceable to positions where they clear said base for enabling said frame to be removed.

11. The platform scale defined in claim 8 comprising a pair of locking pins mounted for limited displacement on opposite ends of said frame, and horizontally extending stop abutment surface means forming a part of said base, said pins being abuttable with said surface means in one position to limit upward displacement and tilting movement of said frame, and means on said pins enabling said pins to be manually displaced to the other of their position, said pins when in said other of said positions being so spaced from said surface means as to enable said frame to be removed upwardly from said base.

12. The platform scale defined in claim 11 comprising bumper means fixed to said frame and cooperating with said base for limiting horizontal displacement of said frame in predetermined directions, said pins being disposed along axes contained in a common plane and extending through apertures in said bumper means.

13. A platform scale comprising a support base, a load-receiving platform, means comprising a pair of lever assemblies each supporting an adjacent pair of corners of said platform and each comprising a torsion bar and a pair of substantially parallel lever arms fixed to each other only by said bar, means pivotally supporting said lever arms of each assembly on said base about essentially parallel fulcrum axes, means pivotally suspending the free end of one of said lever arms of one of said lever assemblies from one of said lever arms of the other of said lever assemblies, a weight indicating device, and motion transmitting means operatively connecting said one lever arm of said other lever assembly to said weight indicating device, said platform being supported on said lever arm of said assemblies at substantially equal distances from the fulcrum axes thereof, and the lever arm distance between the fulcrum axis of said one lever arm of said one lever assembly and the point where it is suspended from the lever arm of said other assembly being equal to the distance between the fulcrum axis of said one lever arm of said other assembly and the point where it suspends said one lever arm of said one assembly.

14. A platform scale comprising a base, a load-receiving platform, a pair of lever assemblies each comprising (a) a torsion bar and (b) first and second substantially parallel spaced apart lever arm units rigidly mounted on opposite ends of said torsion bar and extending vertically below opposite sides of said platform, said bar providing the only force transmitting path between said lever arm units in each of said assemblies, each of said lever arm units comprising (a) first and second substantially parallel, spaced apart lever arms, (b) first knife means and (c) second knife edge means transversely spanning the space between said lever arms, said first and second knife edge means being laterally spaced apart and having quadrilateral cross sections at opposite ends interfittingly press fitted into mating, aligned quadrilateral apertures formed in said lever arms, means cooperating with said first knife edge means for pivotally suspending each lever arm unit from a portion of said base, means pivotally supporting a corner of said platform on each of said second knife edge means of said units in each lever assembly, said first lever arm unit of said first lever assembly extending vertically below said first lever arm unit of said second lever assembly, hanger means, coacting knife edge and bearing means on said hanger means and both of said first lever arm units of said first and second assemblies pivotally suspending said first lever arm unit of said first assembly from said first lever arm unit of said second assembly for transmitting forces from said first assembly to said first lever arm unit of said second assembly, and a weight indicating device operatively connected to said first lever arm unit of said second assembly for providing a measure of the pivotal deflection thereof, the distances between said first and second knife edge means in the lever arm units of both assemblies being equal.

15. The platform scale defined in claim 14 wherein said means pivotally suspending each lever arm assembly comprises a bearing plate means on said portion of said base and hanger means seated on said bearing plate means and operatively engaging said first knife edge means, said bearing plate means comprising a part formed in the shape of a tube having a longitudinally extending slit providing opposed, yieldable arm portions integrally joined by a cross portion, said portion of said base extending upwardly through said slit and having oppositely facing surfaces engaged by said arm portions.

16. The platform scale defined in claim 14 wherein said means pivotally suspending each lever arm unit comprises a C-shaped hanger removably hooked over said portion of said base and engagingly extending under said first knife edge means, and wherein said means supporting said platform on each of said second knife edges comprises a frame removably seated on said second knife edge means, said platform being removably seated on said frame, said platform scale further comprising locking means limiting vertical displacement of said frame, manually manipulatable means for releasing said locking means to enable said frame to be vertically removed from its assembled position, and means for preventing dislodgement of each hanger from its operative position except by removal of said frame.

17. In a platform scale, a base formed with spaced apart upstanding walls, a load receiving platform, means supporting said platform comprising a lever assembly, and means suspending said lever assembly from said walls adjacent each corner of said platform, said means comprising bearing plate means and hanger means seated on said bearing plate means and operatively connected to said lever assembly, said bearing plate means comprising a tubular part made of spring metal and formed with a longitudinal slit to define a pair of yieldable, circumferentially extending arm portions integrally joined together by a circumferential cross portion on which said hanger means is separably seated, the base wall associated with said part removably extending upwardly through said slit and having oppositely facing wall surfaces resiliently engaged by respective ones of said arm portions along the edges thereof delimiting said slit.

18. The platform scale defined in claim 17 wherein each wall is formed with an upwardly opening notch receiving the cross portion of an associated one of said parts, said arm portions each extending at both ends beyond said notch.

References Cited

UNITED STATES PATENTS 1,789,484  1/1931  Walker __________ 177—240 X
2,162,622  6/1939  Lindsay __________ 177—240 X RICHARD B. WILKINSON, *Primary Examiner.*

GEORGE H. MILLER, Jr., *Assistant Examiner.*